C. PEARSON.
CLUTCH MECHANISM.
APPLICATION FILED DEC. 30, 1910.

989,037.

Patented Apr. 11, 1911.

Witnesses:
F. W. Hoffmeister

Inventor:
Charles Pearson
By E. W. Burgess
Attorney

UNITED STATES PATENT OFFICE.

CHARLES PEARSON, OF CHICAGO, ILLINOIS, ASSIGNOR TO INTERNATIONAL HARVESTER COMPANY, A CORPORATION OF NEW JERSEY.

CLUTCH MECHANISM.

989,037.  Specification of Letters Patent.  Patented Apr. 11, 1911.

Application filed December 30, 1910. Serial No. 600,160.

*To all whom it may concern:*

Be it known that I, CHARLES PEARSON, a citizen of the United States, residing at Chicago, in the county of Cook and State of Illinois, have invented certain new and useful Improvements in Clutch Mechanism, of which the following is a specification.

My invention relates to clutch mechanism generally, and is particularly adapted for use in connection with combined hay rakes and stackers wherein the clutch may be operatively connected with the axle and load hoisting means in a manner whereby the power may be transmitted from the traction wheels to the load hoisting means in an efficient and positive manner; the object of my invention being to provide a clutch mechanism that may be easily manipulated and controlled by the operator, simple and strong in its construction, and reliable in operation. These results are attained by means of the mechanism illustrated in the accompanying drawing, in which—

Figure 1:
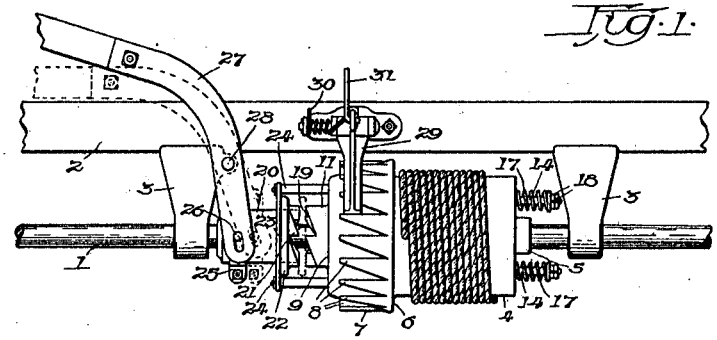
Figure 2:
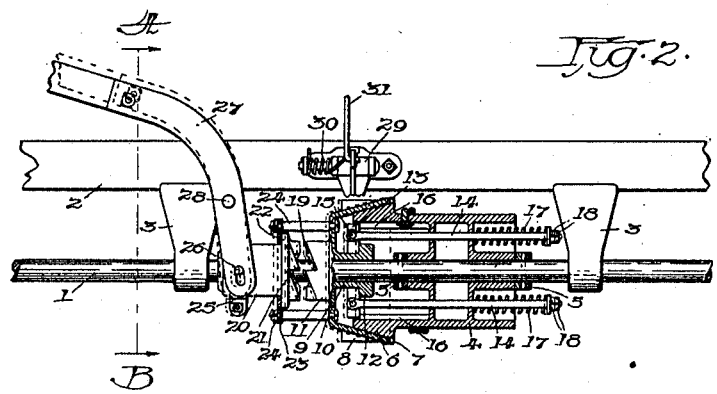
Figure 3:
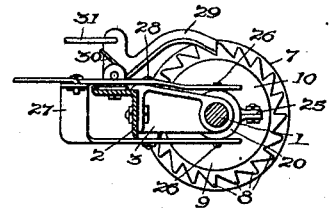
Figure 4:
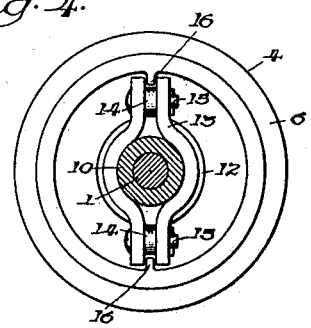

Figure 1 represents a side elevation of a clutch mechanism embodying my invention; Fig. 2 is a similar view with some of the parts of the mechanism shown in section; Fig. 3 is a cross section of Fig. 2 along line A—B, designed to illustrate the manner of mounting the retaining pawl forming part of the clutch controlling means; and Fig. 4 represents an end elevation of part of the clutch controlling means associated with the winding drum.

Like reference characters designate like parts throughout the several views.

1 represents a rotatable shaft that may be the driving axle of a combined hay rake and stacker, such as is shown in my application for patent filed December 5, 1910, Serial No. 595,620; 2 a part of the framework of a machine of that character; 3 bearing brackets secured to frame member 2 and having said axle journaled therein; 4 a winding drum loosely mounted upon the shaft and secured against endwise movement thereon by means of collars 5 secured to the shaft at opposite ends of the winding drum.

The inner end of the drum is provided with a cone clutch portion 6 that is adapted to frictionally engage with a cup-shaped clutch member 7 that is provided upon its periphery with ratchet teeth 8 and a web portion 9, having upon its inner surface a hub portion 10, and upon its opposite surface a hub portion 11, the shaft being journaled in the hub and the latter adapted to have endwise movement upon the shaft. The hub portion 10 is provided with a collar 12, and 13 represents a two-part yoke mounted upon the hub between the flange and web, the two members of the yoke being spaced apart at opposite ends and receiving between them the inner ends of links 14 that are connected with the yoke members by means of pins 15, and 16 represents longitudinally arranged ribs upon the interior of the drum that engage with the yoke members in a slidable manner and also operate to rotate the yoke with the drum. The links pass through openings in the interior webs of the drum, and 17 represents compression springs that encircle the outer ends thereof, and 18 adjusting nuts whereby the active force of the springs may be regulated in a manner to cause more or less friction between the clutch members. The outer end of hub portion 11 is provided with clutch teeth 19, and 20 represents a clutch sleeve slidably mounted upon the shaft in a manner to rotate therewith, and provided with clutch teeth 21 adapted to engage with teeth 19.

22 represents a collar upon the inner end of the sleeve, and 23 a plate having a central opening that loosely receives the body portion of the sleeve, the plate being connected to the web of the cup-shaped clutch member by means of bolts and spacing thimbles 24 in a manner permitting a limited endwise movement of the sleeve independent of the cup-shaped member sufficient to cause engagement or disengagement of the toothed clutch members. The clutch sleeve 20 is further provided at its outer end with a circumferential channel adapted to receive a two-part shipping yoke 25 that is provided with oppositely disposed trunnions 26 that are received by openings at the end of a forked clutch shipping lever 27, that is pivotally connected with the frame of the machine, as at 28, and under the control of the operator.

29 represents a pawl pivotally mounted upon a fixed part of the frame and having a spring 30 operative between the fixed part and the pawl in a manner to yieldingly hold the latter in engagement with the ratchet teeth upon the periphery of the cup-shaped clutch member, the movement of the pawl being controlled by the operator by means of the rod 31.

In operation the clutch sleeve rotates with the shaft, and when the latter is driven in one direction, as by the forward advance of the hay stacker, and the sleeve be caused to engage with its complemental clutch member upon the cup-shaped member, the latter is given a rotative movement that is communicated to the winding drum through a frictional engagement with the cone clutch portion thereof, the degree of pressure between the two parts being regulated by means of the compression springs at the outer end of the winding drum to meet the requirements of its lifting capacity. The load may be held at any desired range of elevation by means of the pawl mechanism, and may be lowered by a reverse movement of the clutch sleeve upon the shaft sufficient to disengage it from its complemental toothed member, and a further movement in the same direction will cause it to draw the cup-shaped member against the force of the springs and away from the cone clutch portion of the winding drum, permitting the latter to rotate freely upon the shaft under a pull upon the winding cable; or the load may be lowered by rotating the shaft in a reverse direction, as by a backward movement of the hay stacker when the pawl is disengaged.

What I claim as my invention, and desire to secure by Letters Patent, is:

1. A clutch mechanism including, in combination, a rotatable shaft, a winding drum loosely mounted and secured against endwise movement upon said shaft, a cone clutch member integral with said drum, a cup-shaped clutch member slidably mounted upon said shaft and yieldingly held in frictional engagement with said cone clutch member, a clutch sleeve slidably mounted upon said shaft in a manner to rotate therewith, said sleeve being provided with clutch teeth adapted to operatively engage with complemental teeth upon said cup-shaped member, and a connection between the sleeve and cup-shaped member whereby the sleeve may be moved in a direction to disengage the coacting toothed members to a predetermined limit independent of said cup-shaped member, and further movement of said sleeve in the same direction being operative to disengage the cup-shaped member from the cone clutch member.

2. A clutch mechanism including, in combination, a rotatable shaft, a winding drum loosely mounted and secured against endwise movement upon said shaft, a cone clutch member integral with said drum, a cup-shaped clutch member including a hub portion slidably mounted upon said shaft, a yoke loosely mounted upon said hub and adapted to move it in one direction, said yoke rotating with said drum and adapted to have a longitudinal sliding movement relative thereto, links connecting said yoke with said drum, compression springs encircling said links and operative to yieldingly hold the cup-shaped friction member in operative engagement with its complemental cone clutch member, and means for sliding said cup-shaped member upon and clutching it in rotatable relation with said shaft.

3. A clutch mechanism including, in combination, a rotatable shaft, a winding drum loosely mounted and secured against endwise movement upon said shaft, a cone clutch member integral with said drum, a cup-shaped clutch member including a hub portion slidably mounted upon said shaft, a yoke loosely mounted upon said hub and adapted to move it in one direction, said yoke rotating with said drum and adapted to have a longitudinal sliding movement relative thereto, links connecting said yoke with said drum, compression springs encircling said links and operative to yieldingly hold the cup-shaped friction member in operative engagement with its complemental cone clutch member, a clutch sleeve slidably mounted upon said shaft and rotatable therewith, said sleeve provided with clutch teeth adapted to engage with complemental teeth upon said cup-shaped member, a plate secured to said cup-shaped member and having an axial opening therein that receives said sleeve, a flange on said sleeve adapted to engage with said plate whereby a sliding movement of said sleeve in one direction is transmitted to said cup-shaped member.

4. A clutch mechanism including, in combination, a rotatable shaft, a winding drum loosely mounted and secured against endwise movement upon said shaft, a cone clutch member integral with said drum, a cup-shaped clutch member slidably mounted upon said shaft and yieldingly held in frictional engagement with said cone clutch member, a clutch sleeve slidably mounted upon said shaft in a manner to rotate therewith, said sleeve provided with clutch teeth adapted to operatively engage with corresponding teeth upon said cup-shaped member, a connection between the sleeve and said cup-shaped member whereby the sleeve may be moved in a direction to disengage the coacting toothed members to a predetermined limit independent of said cup-shaped member, ratchet teeth upon said cup-shaped member, and a manually controlled pawl pivotally connected with the fixed part of the mechanism and adapted to engage with said ratchet teeth, a further movement of said sleeve in the same direction being operative to disengage the cup-shaped member from the cone clutch member.

CHARLES PEARSON.

Witnesses:
 RAY D. LEE,
 WILLIAM WEBBER.

Copies of this patent may be obtained for five cents each, by addressing the "Commissioner of Patents, Washington, D. C."